Inventor
ROY W. BROWN

Patented July 29, 1947

2,424,918

UNITED STATES PATENT OFFICE 2,424,918

TUBELESS TIRE AND RIM

Roy W. Brown, Akron, Ohio, assignor to The Firestone Tire & Rubber Company, Akron, Ohio, a corporation of Ohio Original application December 9, 1942, Serial No. 468,336. Divided and this application January 7, 1944, Serial No. 517,413

2 Claims. (Cl. 152—401)

This invention relates to flexible pressure containers, and more especially it relates to flexible, pneumatic tires.

An object of the invention is to produce a tire and rim assembly adapted to be used in service with the air used as the medium for the tire inflation pressure in direct contact with the inside ply of the tire.

Figure 1:
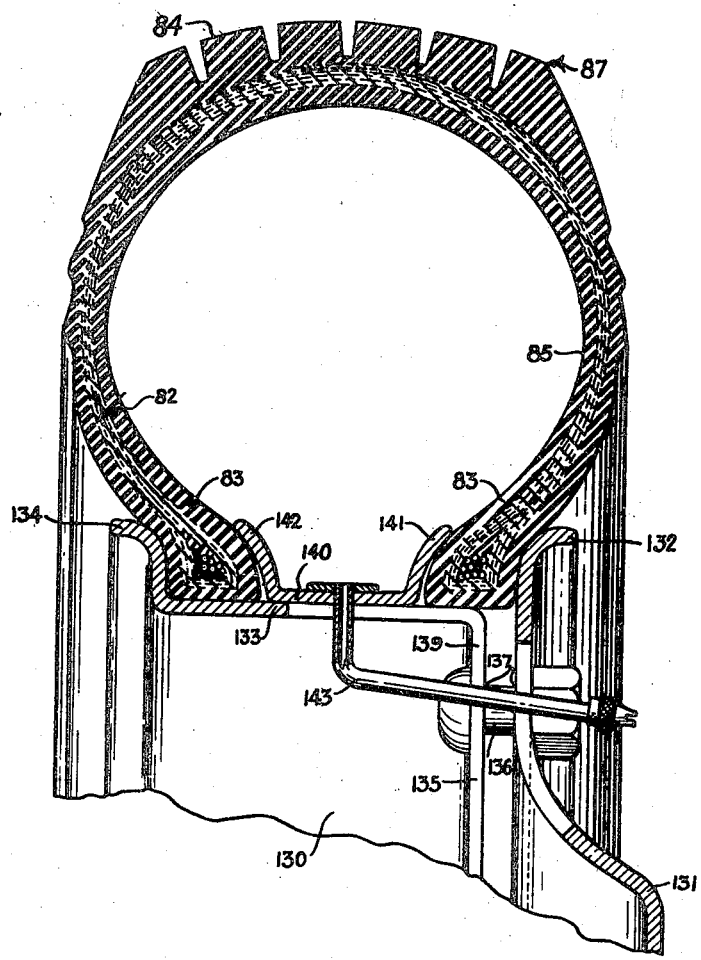
Figure 2:
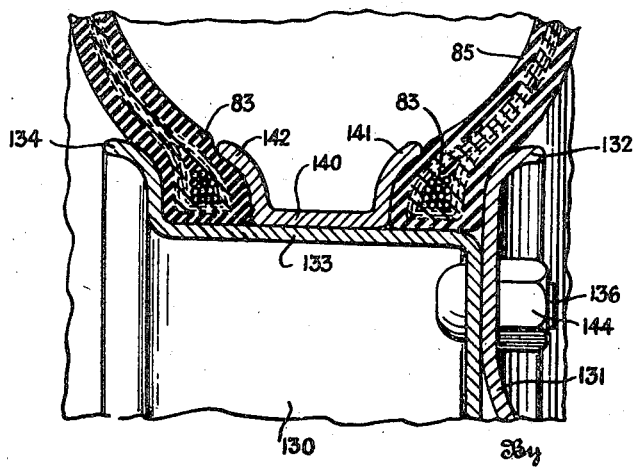

Of the accompanying drawing:

Fig. 1 is a transverse section through a tubeless tire and tire rim embodying the invention, said rim being a divided two-part structure with the elements thereof in separated relation; and Fig. 2 is a fragmentary section of the parts shown in Fig. 1, the elements of the tire rim being drawn tightly together.

This application is a division of my copending application Serial No. 468,336, filed December 9, 1942, now Patent Number 2,354,446, dated July 25, 1944.

Referring to Fig. 1 of the drawing there is shown there a tire 87 having the usual rubberized cord fabric body 82 having marginal inextensible bead portions 83 and a tread portion 84. The interior of the tire is provided with a layer or skim coat of impervious rubber compound 85 which may be laminated to insure an impervious structure.

As will be understood by those familiar with the art the inner tire layer 85 is common in tubeless tires and it is to be understood that the tire 87 may be built and molded in any manner found satisfactory. The drawing illustrates tire 87 mounted for use in service as a tubeless tire. The tire 87 is mounted upon a wheel assembly 130 that includes a wheel disc 131 having a tire engaging flange 132 at its outer edge. The wheel disc 131 is operatively associated with an annular rim section 133 having an outwardly directed tire engaging flange 134 at one edge thereof and a radially inwardly directed flange 135 adapted to abut against a portion of the wheel disc 131 formed at the other edge thereof. Rim bolts 136 extend through holes 137 to secure the wheel disc and rim section together to form a split rim and wheel unit. Bolts 136 are of sufficient length to permit the rim section 133 to be laterally spaced an appreciable distance from the wheel disc 131 when the bolts extend loosely between the wheel disc and the rim section. A valve receiving slot 139 is formed in the flange 135 of the rim section 133 which slot extends over half way across the section 133, as shown. A corresponding slot is formed in the wheel disc 131 and is adapted to be aligned with the slot 139 when the wheel is assembled.

A sealing ring 140 having outwardly extending flanges 141 and 142 is mounted between the marginal bead portions 83 of the tire 87. An angle-valve innertube valve stem 143 is attached to the base of the sealing ring 140 in any manner found satisfactory whereby a tire inflation medium such as air, may flow through the stem 143 into the tire 87. The outer lateral faces of the flanges 141 and 142 flare radially and laterally outwardly at a greater angle to the peripheral face of the base of ring 140 than do the inner lateral surfaces of the beads 87 with relation to the base of the rim section 133. In order that the inner lateral surfaces of said beads shall bear a definite relation to the angle of flanges 141, 142, the said inner surfaces may be molded while in contact with suitable inside bead forming rings to impart a determinate molded contour to said surfaces.

In operation the mounting of the wheel assembly is accomplished by first placing the ring 140 in the tire 87 in the usual manner of mounting tire bead locking rings, tire flaps and the like. Then with the disc 131 removed from the rim section 133 the tire 87, together with the ring 140, is placed in position on the rim section 133 with the valve stem 143 in position in the slot 139. Next the disc 131, with its valve opening aligned with the slot 139 and the valve stem 143 projecting through said slot, receives the section 133 in bolted relation, the bolts 136 being used for this purpose. This manner of assembling will be understood by those familiar with the art and further discussion is considered to be unnecessary; however, it is to be noted by reference to Fig. 2 that the invention contemplates a width for the sealing ring 140, and the tire bead portions 83 which together are a greater width than the width between the tire engaging flanges 134 and 132 when the members 131 and 135 are in contact. Consequently as the rim section 133 is drawn toward the disc 131 by tightening down nuts 144 the outer edges of the flanges 141 and 142 of the sealing ring 140 will first engage the inner portion of the tire 87. As the members 133 and 131 continue to move toward each other the appreciable distance they were separated until they are in abutted relation the tire portions 83 are firmly clamped between the sealing ring flange 142 and the rim section flange 134 on one side of the assembly and between the flanges 141 and 132 on the other side. The sealing ring 140 is preferably composed of spring steel so that as the tire presses against the peripheral edges of the flanges 141 and 142 these flanges will be pressed laterally inwardly, whereby a positive air-tight seal between the inside of the tire and the sealing ring is assured, since any fatigue or flow of rubber away from the pressure of the sealing ring 140 will be followed up by the laterally inwardly pressed spring steel flanges 141 and 142. It is to be noted that upon first contact of the edges of the flanges 141 and 142 with the rubber 85 almost a line contact is made which insures high unit pressure contact; however, as the edges of the flanges sink into the rubber more surface of the flanges become progressively involved thereby providing a limit to the distance the flanges press into the rubber coat 85 whereby contact between said flanges and the fabric plies of the tire 87 is prevented. It is also to be noted that the contour of the bead portions 83 is molded to exact shape by the sealing ring used during the molding of the tire thereby establishing a positive relation between the tire sealing beads on a tire road rim and the tire bead portions.

It will now be seen that applicant has produced a novel and useful tubeless tire not heretofore known and that applicant's invention is a substantial contribution to the art, particularly so, in that it represents a reduction in the amount of rubber heretofore required to provide a given tire mileage.

Modifications may be resorted to without departing from the spirit of the invention or the scope of the appended claims.

What is claimed is:

1. In combination a tire, metal tire sealing ring, circumferentially split tire rim and rim bolts, said tire having an inner coat of substantial thickness, said coat being impervious to air, the inner surface of the bead portion of said tire being accurately molded to determinate contour with relation to said sealing ring, said sealing ring having side flanges which extend radially and axially outwardly from the base of the ring, said flanges being flared outwardly from the base of said ring at such an angle and having lateral faces of a contour that when mounting said ring in said combination the outer lateral peripheral edge portions of said flanges first engage the said tire inner coat when the said sealing ring is mounted in said tire and said tire mounted on said rim and the members of said split rim are progressively drawn together by said bolts, the relative shapes of said flanges and tire bead portion, and the thickness of said coat, being such that after said peripheral edge portions engage said coat additional surface areas of said flanges progressively are brought into contact with the tire bead portion whereby said peripherial edges are prevented from cutting through said coat and making contact with the tire fabric plies.

2. In a wheel assembly, a tire, a tire sealing ring, circumferentially split tire rim and rim bolts, said tire having an inside coat of substantial thickness, said coat being impervious to air, the inner surface of the bead portion of said tire being accurately molded to a determinate contour relative to the contour of said sealing ring, said sealing ring being continuous and being composed of spring steel and having side flanges which extend radially and axially outwardly from the base of the ring, said flanges being flared outwardly from the base of said ring at such angle and having lateral faces of such contour that the outer lateral peripheral edge portions of said flanges first make contact with the said tire coat when the said sealing ring is mounted in said tire and said tire mounted on said rim and the members of said split rim are progressively drawn together by said bolts, the relative shapes of said flanges and tire bead portions being such that after said peripheral edge portions engage said coat additional surface areas of said flanges progressively are brought into contact with the tire bead portions.

ROY W. BROWN.

REFERENCES CITED

The following references are of record in the file of this patent:

UNITED STATES PATENTS

| Number | Name | Date |
| --- | --- | --- |
| 1,637,599 | Ballew | Aug. 2, 1927 |
| 1,647,205 | Wais | Nov. 1, 1927 |
| 1,991,594 | Case | Feb. 19, 1935 |
| 2,125,786 | Hurlimann | Aug. 2, 1938 |

FOREIGN PATENTS

| Number | Country | Date |
| --- | --- | --- |
| 6,232 | Great Britain | 1903 |